United States Patent [19]

Baloche et al.

[11] Patent Number: 5,997,090
[45] Date of Patent: Dec. 7, 1999

[54] HINGE DEVICE FOR A VEHICLE SEAT, AND A VEHICLE SEAT INCLUDING SUCH DEVICE

[75] Inventors: François Baloche, La Pilonnière; René Rohee, Le Cotil, both of France

[73] Assignee: Bertrand Faure Equipments SA, Boulogne, France

[21] Appl. No.: 09/116,384

[22] Filed: Jul. 16, 1998

[30] Foreign Application Priority Data

Jul. 18, 1997 [FR] France .................................. 97 09167

[51] Int. Cl.⁶ ...................................................... B60N 2/22
[52] U.S. Cl. ........................................ 297/367; 297/328.12
[58] Field of Search .............................. 297/367, 378.12

[56] References Cited

U.S. PATENT DOCUMENTS

| | | | |
|---|---|---|---|
| 4,076,309 | 2/1978 | Chekirda et al. | 297/367 |
| 4,132,447 | 1/1979 | Terada | 297/367 |
| 4,268,086 | 5/1981 | Okuyama | 297/367 X |
| 4,538,856 | 9/1985 | Katsumoto et al. | 297/367 |
| 4,611,853 | 9/1986 | Lehmann et al. | 297/379 |
| 5,393,116 | 2/1995 | Bolsworth et al. | 297/328.12 X |
| 5,397,167 | 3/1995 | Fourrey et al. | 297/354.13 |
| 5,454,624 | 10/1995 | Anglade et al. | 297/354.13 |
| 5,779,313 | 7/1998 | Rohee | 297/367 |

FOREIGN PATENT DOCUMENTS

| | | | |
|---|---|---|---|
| 0 575 215 A1 | 12/1993 | European Pat. Off. | B60N 2/32 |
| 0 628 445 A1 | 12/1994 | European Pat. Off. | B60N 2/04 |
| 0 679 550 A1 | 11/1995 | European Pat. Off. | B60N 2/02 |
| 0 770 514 A1 | 5/1997 | European Pat. Off. | B60N 2/22 |
| 1 596 746 | 7/1970 | France . | |
| 2 306 102 | 10/1976 | France | B60N 1/02 |
| 2 538 322 | 6/1984 | France | B60N 1/06 |
| 2 606 180 | 5/1988 | France | B60N 1/06 |
| 2 690 880 | 11/1993 | France | B60N 2/22 |
| 44 00 911 A1 | 8/1994 | Germany | B60N 2/22 |
| 2 197 830 | 6/1988 | United Kingdom | B60N 1/00 |

OTHER PUBLICATIONS

French Preliminary Search Report dated Apr. 2, 1998, French Appl. No. FR 9709167.
WPIL Derwent Data Base abstract corresponding to FR 2 306 102.
WPIL Derwent Data Base abstract corresponding to FR 2 690 880.

*Primary Examiner*—Peter R. Brown
*Attorney, Agent, or Firm*—Marshall, O'Toole, Gerstein, Murray & Borun

[57] ABSTRACT

The hinge device for a vehicle seat comprises an intermediate plate carrying first and second cheek-plates, one designed to be fixed to the seat-back and the other to the seat proper. The first cheek-plate is connected to the intermediate plate via a mechanism enabling the inclination of the seat-back to be adjusted in substantially continuous manner. The second cheek-plate is connected to the intermediate plate via a locking mechanism controlled by the same handle as the mechanism for adjusting the inclination of the seat-back.

8 Claims, 5 Drawing Sheets

FIG. 6.
FIG. 7.
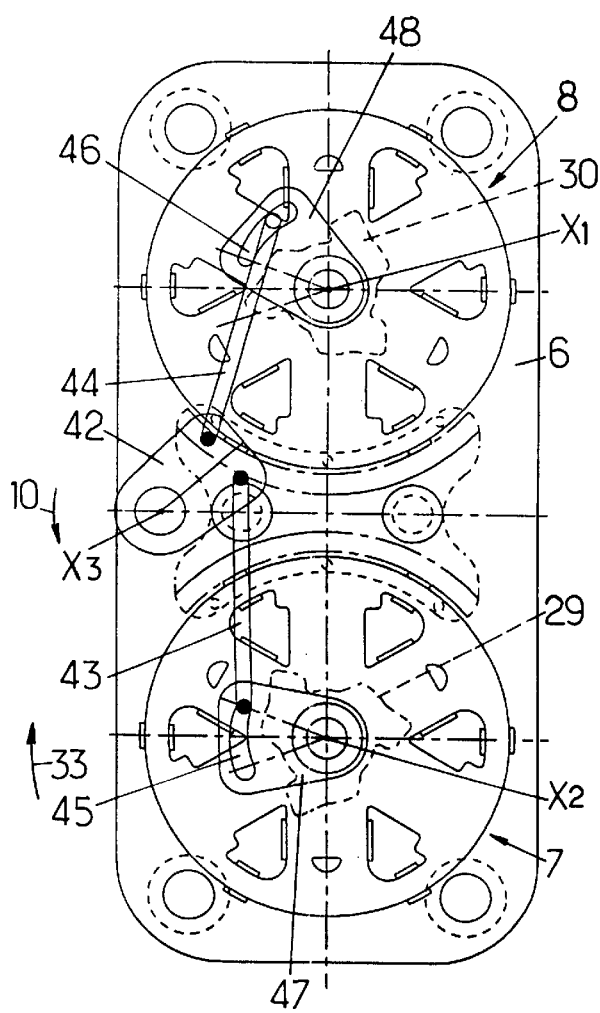
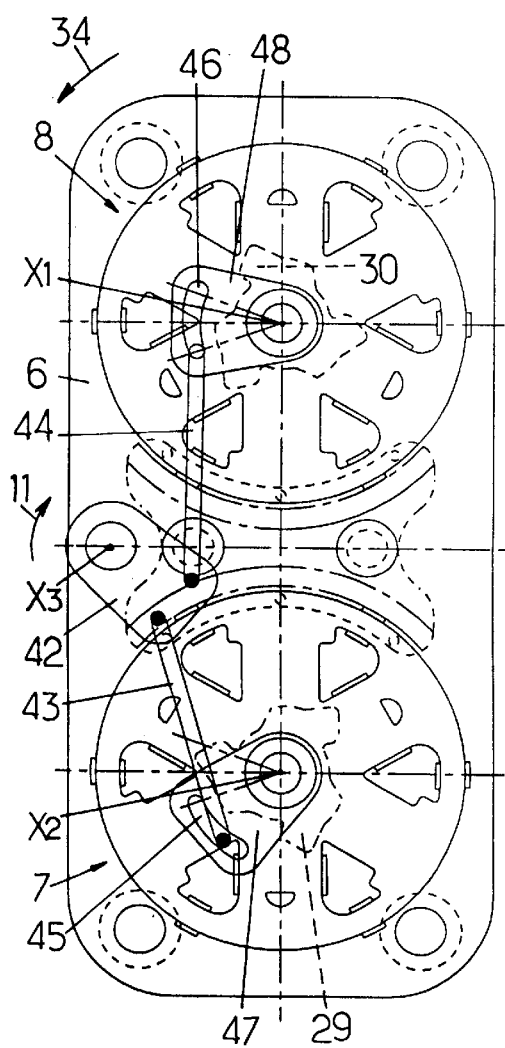

HINGE DEVICE FOR A VEHICLE SEAT, AND A VEHICLE SEAT INCLUDING SUCH DEVICE

FIELD OF THE INVENTION

The present invention relates to hinge devices for vehicle seats, and to vehicle seats including such devices.

More particularly, the invention relates to a hinge device for a vehicle seat comprising a seat-back pivotally mounted on a seat proper, one of the seat-back and the seat proper being referred to below as the "first" seat element and the other as the "second" seat element, the hinge device comprising:

- a one-piece rigid intermediate plate of general shape that is substantially plane;
- a first hinge comprising a first rigid cheek-plate parallel to the intermediate plate and pivotally mounted on said intermediate plate about a first pivot axis perpendicular to said intermediate plate, the first cheek-plate being designed to be secured to the first seat element and being connected to the intermediate plate via a first mechanism adapted to enable the angular position of the first cheek-plate relative to said intermediate plate to be adjusted in substantially continuous manner, and said first mechanism being contained in a first closed housing defined by the first cheek-plate and by the intermediate plate, which intermediate plate is axially secured to the first cheek-plate to close the first housing; and
- a second hinge comprising a second rigid cheek-plate parallel to the intermediate plate and pivotally mounted on said intermediate plate about a second pivot axis perpendicular to said intermediate plate and offset from the first pivot axis, said second cheek-plate being designed to be secured to the second seat element and being connected to the intermediate plate via a second mechanism adapted to enable the second cheek-plate to be locked in at least one position relative to said intermediate plate, and the second mechanism being contained in a second closed housing defined by the second cheek-plate and by the intermediate plate, which intermediate plate is axially secured to the second cheek-plate to close the second housing.

BACKGROUND OF THE INVENTION

Such a hinge device is disclosed by document DE-A-44 00 911.

The hinge device described in that document is nevertheless slow and difficult to operate.

OBJECTS AND SUMMARY OF THE INVENTION

A particular object of the present invention is to mitigate that drawback.

To this end, according to the invention, in a hinge device of the kind in question the first mechanism comprises:

- a circular set of teeth centered on the first pivot axis, said circular set of teeth being secured to the first cheek-plate and the teeth being directed radially inwards;
- at least one toothed slug mounted to slide radially relative to the intermediate plate between an engagement position in which the slug meshes with the circular set of teeth of the first mechanism to lock the first hinge, and a retracted position in which said slug does not co-operate with said circular set of teeth;
- a cam resiliently urged towards a rest position in which it places the slug of the first mechanism in its engagement position, said cam being capable of being moved to an actuation position where it enables said slug to slide towards its retracted position; and
- means for moving the slug of the first mechanism radially inwards from its engagement position to its retracted position when the cam of the first mechanism passes from its rest position to its actuation position;

the second mechanism comprises:

- at least one slug mounted to slide radially between an engagement position where it co-operates with a complementary member to lock the second mechanism, and a retracted position where said slug does not co-operate with said complementary member, one of said slug and said complementary member being carried by the intermediate plate and the other by the second cheek-plate;
- a cam resiliently urged towards a rest position in which said cam places the slug in its engagement position;
- a drive member for moving the cam from its rest position towards an actuation position where said cam enables the slug to slide towards its retracted position; and
- means for moving the slug radially inwards from its engagement position to its retracted position when the cam passes from its rest position to its actuation position;

and the slug of the second mechanism is carried by the intermediate plate while the complementary member which co-operates with said slug is carried by the second cheek-plate, and said drive member is common to the first and second mechanisms, said drive member being connected to the cams of the first and second mechanisms respectively via first and second mechanical links with lost motion, said drive member having a rest position which corresponds to the cams of the first and second mechanism both being in their respective rest positions, the first mechanical link with lost motion being adapted to move the cam of the first mechanism from its rest position to its actuation position when the drive member is moved in a first direction from its rest position but not to interact with said cam of the first mechanism when the drive member is moved from its rest position in a second direction opposite to the first direction, and the second mechanical link with lost motion being adapted to move the cam of the second mechanism from its rest position to its actuation position when the drive member is moved from its rest position in the second direction, but not to interact with said cam of the second mechanism when the drive member is moved in the first direction.

This provides a saving of one cheek-plate for each of the first and second hinges.

In preferred embodiments of the invention, use may optionally also be made of one or more of the following dispositions:

- the second mechanism is adapted to enable the second cheek-plate to be locked relative to the intermediate plate in a number n of relative locking positions, n being an integer lying in the range 1 to 3, the second mechanism being capable of being released and then allowing the second cheek-plate to pivot freely from its locking position either in a first angular direction over a first angular stroke of at least 600, or in a second angular position opposite to the first angular position over a second angular stroke of at least 600: by means of these dispositions, the hinge device of the invention can be used either with its first cheek-plate fixed to the seat proper and its second cheek-plate fixed to the seat-back, or with its first cheek-plate fixed to the seat-back and its second cheek-plate fixed to the seat proper, thereby making it possible to standardize manufacture of such a two-hinge device; the hinge device of the invention is thus equally usable:

in seats having a seat-back that can be folded down backwards into a bed configuration;

in seats having a back that needs to be easy to fold down forwards in order to gain access to the space situated behind the seat, particularly for two-door vehicles, in which case the first cheek-plate is generally fixed to the seat-back and the second cheek-plate to the seat proper; and in seats where the seat-back needs to be capable of folded down forwards into a substantially horizontal position to constitute a table, in which case the first cheek-plate is generally fixed to the seat proper and the second cheek-plate to the seat-back;

the hinge device is generally symmetrical in shape about a central axis situated inbetween the first and second pivot axes;

each of the first and second cheek-plates is generally circular in shape;

said complementary member is a circular set of teeth centered on the second pivot axis and directed radially inwards, the slug having an outwardly directed set of teeth adapted to engage with said circular set of teeth, and said slug also having a peg projecting axially and co-operating with a circular guide secured to the circular set of teeth, said circular guide having at least one gap in which the peg engages when the intermediate plate and the second cheek-plate are in their relative angular position for locking, thereby enabling the slug to engage with said circular set of teeth, and the circular guide is adapted to co-operate with the peg by holding the slug in its retracted position when the intermediate plate and the second cheek-plate are not in their relative angular position for locking; and the drive member is a handle rotatable about a third pivot axis perpendicular to the intermediate plate, the first and second mechanical links having lost motion each comprising a connecting rod connecting said handle to the corresponding cam.

The invention also provides a vehicle seat including a seat-back mounted on a seat proper by means of a hinge device as defined above, disposed on one side of the seat so that the first and second pivot axes extend horizontally and transversely relative to the seat, the first cheek-plate being secured to the seat-back and the second cheek-plate being secured to the seat proper, or the first cheek-plate being secured to the seat proper and the second cheek-plate being secured to the seatback.

BRIEF DESCRIPTION OF THE DRAWINGS

Other characteristics and advantages of the invention appear from the following detailed description of two embodiments thereof, given as non-limiting examples, and described with reference to the accompanying drawings.

In the drawings:

FIG. 6 and 7 are views similar to FIG. 5 respectively showing the unlocked position of the adjustment mechanism and the unlocked position of the locking mechanism of the hinge device.

MORE DETAILED DESCRIPTION

In the various figures, the same references are used to designate elements that are identical or similar.

Figure 1:
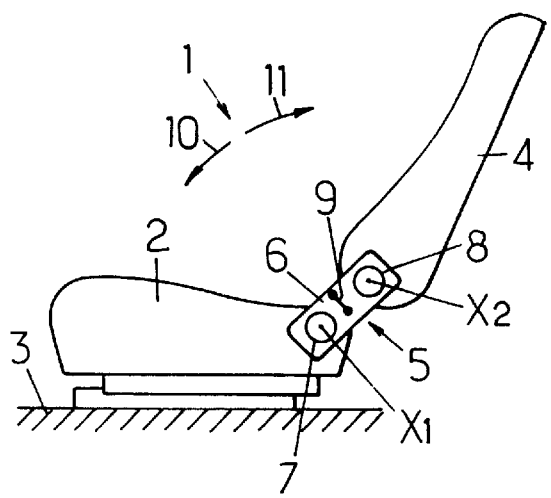
FIGS. 1 and 2 are diagrammatic views showing a seat constituting a first embodiment of the invention, respectively with its back raised and with its back folded do forwards.
Figure 2:
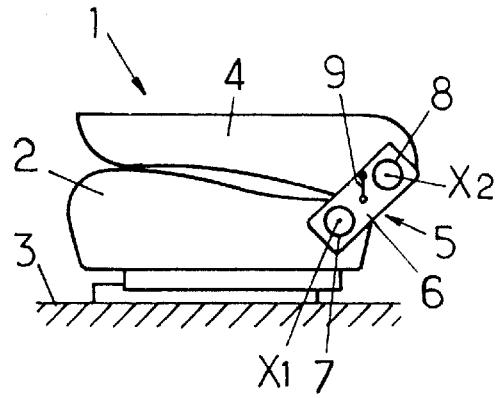

FIGS. 1 and 2 show a vehicle seat 1, in particular a motor vehicle front seat, having a seat proper 2 mounted on the floor 3 of the vehicle, and a seat-back 4 pivotally mounted on the seat proper by means of a hinge device 5.

The hinge device comprises:

a rigid metal intermediate plate 6 in one piece which extends in a vertical plane on one side of the seat 1;

a first hinge 7 enabling the intermediate plate 6 to be pivoted relative to the seat proper 2 about a transverse horizontal axis X1 to adjust the inclination of the seat-back 4 in substantially continuous manner; and a second hinge 8 which connects the seat-back 4 to the intermediate plate 6 and which makes it possible either to lock the seat-back 4 in a predetermined relative angular position relative to the plate 5 referred to as the "locked position", which position corresponds to the seat-back being in its raised position (FIG. 1), or else to fold the seat-back 4 down forwards by causing it to pivot about an axis X2 parallel to the axis X1 but offset upwards therefrom, so as to place the seat-back 4 in a substantially horizontal position where the rear face of said seat-back can be used as a table (FIG. 2).

The hinges 7 and 8 are both controlled by the same control member such as a handle 9 which can be moved either in a first angular direction 10 to enable the first hinge 7 to be adjusted, or in the opposite angular direction 11 to unlock the second hinge 8.

On the side of the seat which is not visible in FIGS. 1 and 2, the seat-back 4 is connected to the seat proper 2 via an intermediate plate which is similar to the plate 6 and which is connected respectively to the seat proper 2 and to the seat-back 4 either via simple pivots correspondingly located on the axes X1 and X2, or via hinges identical to the hinges 7 and 8 and controlled synchronously with the hinges 7 and 8 via a transverse link (not shown).

Figure 3:
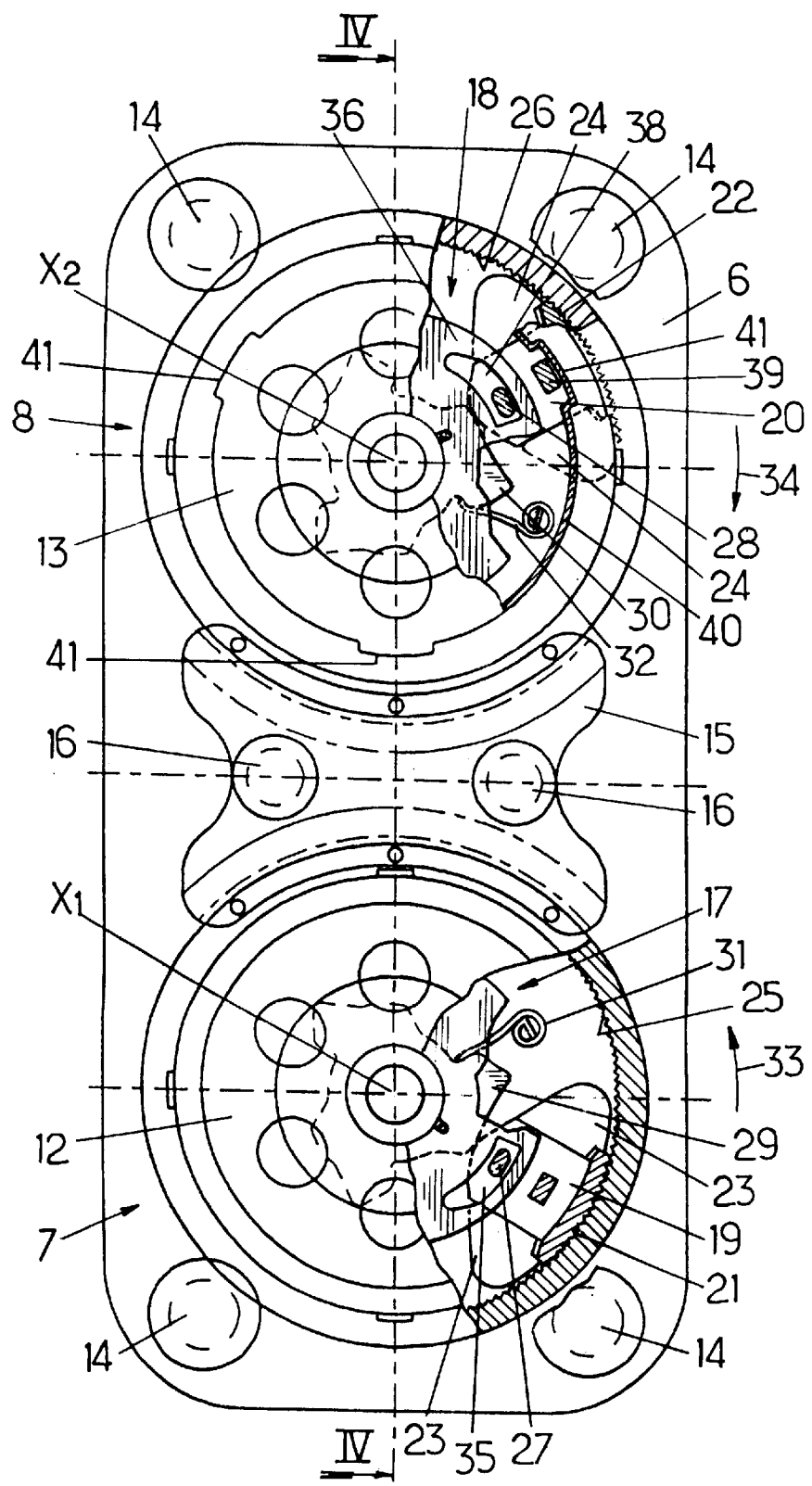
FIG. 3 is a partially cutaway inside view of the hinge device interconnecting the seat-back and the seat proper in the seat of FIGS. 1 and 2, said hinge device including an adjustment mechanism and a locking mechanism.
Figure 4:
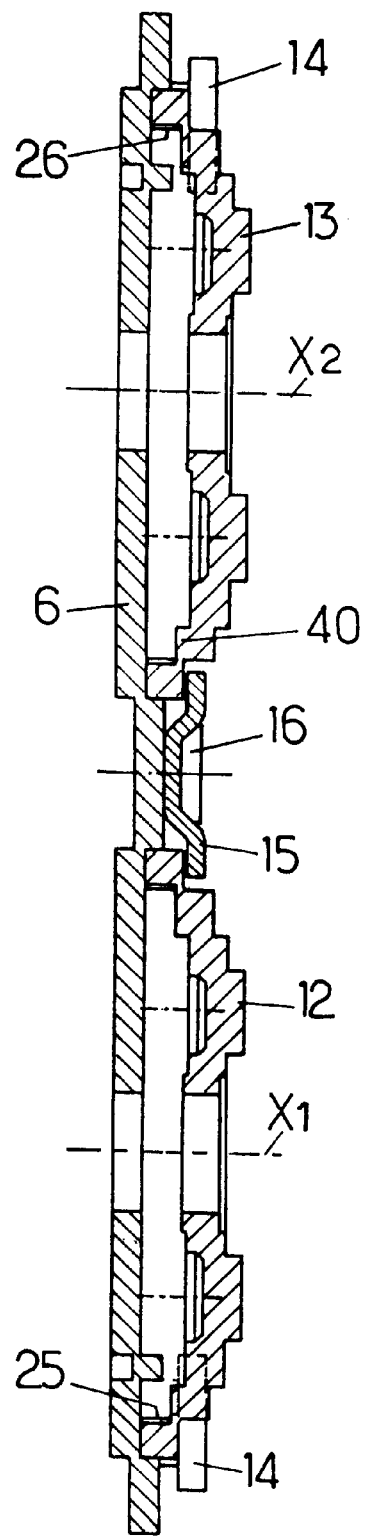
FIG. 4 is a section view on line IV—IV of FIG. 3, in which the adjustment and locking mechanisms of the hinge device are not shown for reasons of greater clarity.

As shown in FIGS. 3 and 4, each of the hinges 7 and 8 comprises a rigid metal cheek-plate respectively referenced 12, 13 that is generally circular in shape, being centered on the corresponding pivot axis, respectively X1, X2. These two cheek-plates 12 and 13 are pivotally mounted on the intermediate plate 6 and they are held on said plate, e.g. by means of rivets 14 and a stamped central plate 15, itself held on the intermediate plate 6 by means of rivets 16.

In the example described herein, the cheek-plate 12 is secured to the structure of the seat proper 2 while the cheek-plate 13 is secured to the structure of the seat-back 4, with these two cheek-plates being connected to the intermediate plate 6 respectively by an adjustment mechanism 17 and by a locking mechanism 18.

These locking and adjustment mechanisms are both mechanisms having toothed slugs, that are known per se, each comprising:

three rigid metal slugs, 19, 20, disposed at 120° to one another and provided with external teeth, 21, 22, said three slugs being mounted to slide relative to the corresponding pivot axis X1, X2 between respective guides 23, 24 which are formed by projections stamped in the intermediate plate 6, the slugs 19, 20 being movable in this case firstly between an engagement position in which the slugs mesh with a circular set of inwardly-directed teeth 25, 26 formed in the corresponding cheek-plate 12, 13, and a retracted position in which they do not cooperate with said teeth, each slug 19, 20 also having a respective first peg 27, 28 projecting axially towards the corresponding cheek-plate 12, 13;

a respective rigid cam 29, 30 urged by respective springs 31, 32 towards a rest position in which it places the slugs 19, 20 in their engagement position, said cam being moveable in a respective angular direction 33, 34 to an actuation position in which it enables the corresponding slugs 19, 20 to slide radially inwards to the retracted position; and a respective rigid metal plate 35, 36 extending radially between the cam 29, 30 and the corresponding cheek-plate 12, 13 so as to cover the cam 29, 30 and a portion of the slugs 19, 20, said plate having three cutouts, respectively 36, 38, in which the first pegs 27, 28 of the three slugs of the hinge penetrate, each cutout having an outside edge sloping at one of its ends so as to urge the first peg 35, 36 of the corresponding slug radially inwards when the cam 29, 30 is moved in its actuation angular direction 33, 34.

In addition, the locking mechanism 18 also has the following features:

each of the three slugs 20 of this mechanism also has a second peg 39 projecting axially towards the cheek-plate 13, said second peg being disposed radially outside the first peg 28; and the cheek-plate 13 has a circular edge 40 centered on the axis X2 with the inside surface thereof having three notches 41 at 120° intervals from one another forming local enlargements of the edge 40, said notches receiving the second pegs 39 of the slugs 20 enabling said slugs to mesh with the teeth 26 when the cheek-plate 13 is in one of its three locking angular positions, and the circular edge 40 constituting an abutment for the second pegs 39 thus preventing the slugs 20 from engaging the teeth 26 when the cheek-plate 13 is not in its angular locking positions.

Figure 5:
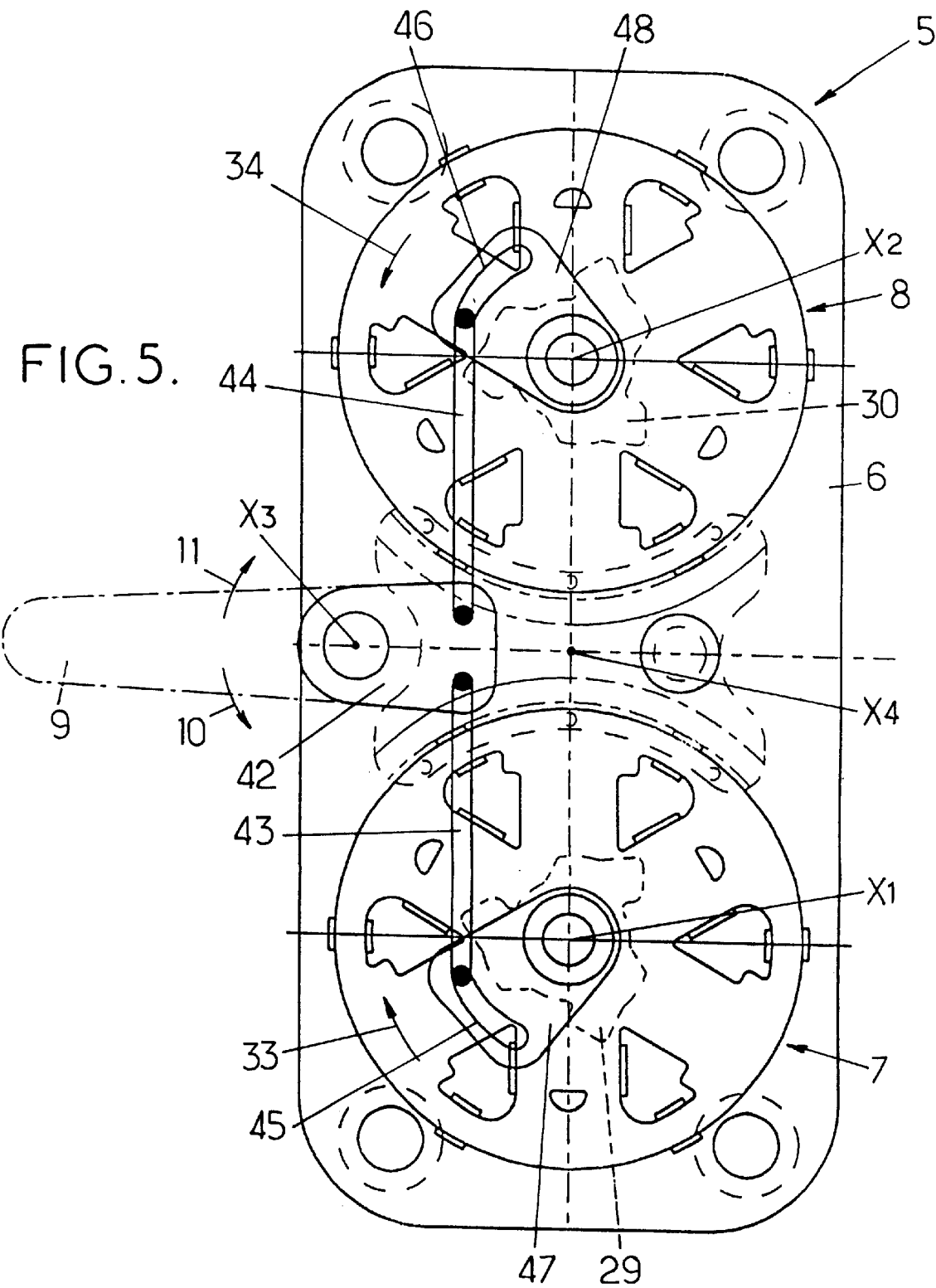
FIG. 5 is a outside view of the hinge device of FIG. 3, in the rest position.

Also, as shown in FIGS. 5 to 7, the control handle 9 of the hinge device is pivotally mounted on the intermediate plate 6 about an axis X3, said handle being secured to a lever 42 on which the first ends of two connecting rods 43, 44 are hinged, with the second ends of said connecting rods being pivotally mounted in oblong slots respectively 45, 46 formed in two levers 47, 48 which are secured respectively to the cams 29 and 30.

When the handle 9 is in its rest position, as shown in FIG. 5, both cams 29 and 30 belonging respectively to the hinges 7 and 8 are likewise in their rest positions, such that both hinges are locked.

In this position, the second ends of the connecting rods 43 and 44 are in abutment against the ends of the oblong slots 45 and 46 which are closer to the handle 9.

When a user seeks to adjust the inclination of the seat-back 4, it is necessary to pivot the handle 9 and the lever 42 in angular direction 10, as shown in FIG. 6, such that:

the lever 47 and the cam 29 pivot in angular direction 33 under drive from the connecting rod 43, for the purpose of releasing the adjustment mechanism 17, thereby allowing the user to adjust the inclination of the seat-back by acting directly thereon; and the second end of the other connecting rod 44 merely slides in its slot 46 such that the locking mechanism 18 of the hinge 8 remains in its locked position.

In contrast, when the user seeks to fold the seatback down forwards into the position shown in FIG. 2, the handle 9 and the lever 42 should be actuated in angular direction 11 (FIG. 7) such that:

the second end of the connecting rod 43 slides in its oblong slot 45 without acting on the lever 47 and the cam 29, thus leaving the hinge 7 in its locked position; and the connecting rod 44 pulls the lever 48 and the cam 30 in angular direction 34 opposite to direction 33, thereby releasing the locking mechanism 18 of the hinge 8, after which the seat-back 4 can pivot freely forwards to its folded-down position, the slugs 20 of the locking mechanism then remaining in their retracted position because of the co-operation between the second pegs 39 of said slugs and the circular edge 40.

Thereafter, when it is desired to return the seat 1 to its position for normal use, it suffices to raise the seat-back 4 which automatically locks itself back in its initial position once the second pegs 39 of the slugs 20 come back into register with the notches 41.

Figure 8:
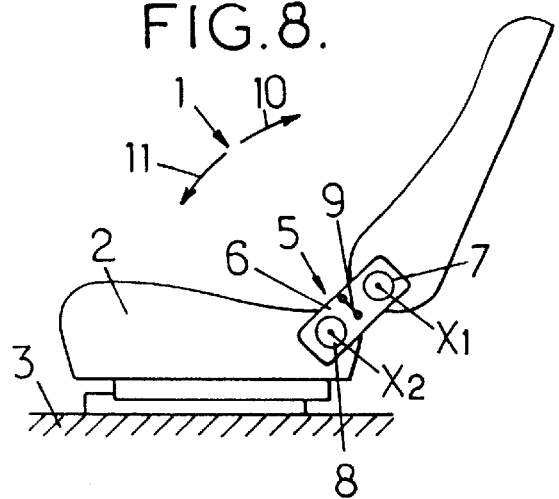
FIGS. 8 and 9 are views similar to FIGS. 1 and 2, but for a second embodiment of the invention.
Figure 9:
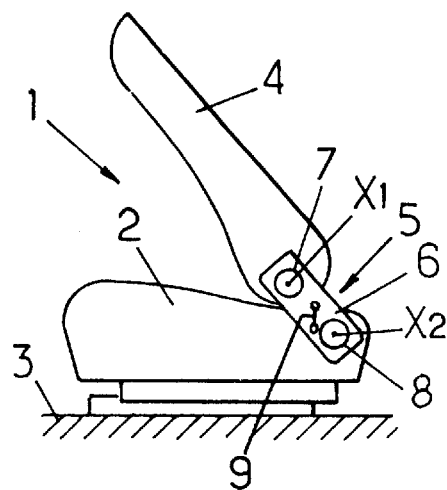

In a second embodiment, as shown in FIGS. 8 and 9, the cheek-plate 12 of hinge 7 is connected to the structure of the seat-back 4 while the cheek-plate 13 of the hinge 8 is connected to the structure of the seat proper 2, with the hinge device 5 otherwise remaining unchanged, except insofar as it may be necessary to reverse the direction in which the handle 9 extends, unless it is implemented as a circular knob.

Changing the disposition of the hinge device 5 in this way is particularly simple since the mechanism is generally symmetrical in shape about a central axis X4 (FIG. 5) situated halfway between the axes X1 and X2.

This provides a seat which is well adapted to providing access to the back seats of a two-door vehicle when the seat-back is folded down forwards as shown in FIG. 9.

Finally, it may be observed that the hinge 8 also makes it possible in all of the above-described cases, to tilt the seat-back 4 down backwards into a bed configuration.

We claim:

1. A hinge device for a vehicle seat having a seat-back pivotally mounted on a seat proper, one of the seat-back and the seat proper being referred to as the first seat element and the other as the second seat element, the hinge device comprising:

a unitary rigid intermediate plate that is substantially planar;

a first hinge comprising a first rigid cheek-plate that is substantially parallel to the intermediate plate and pivotally mounted on said intermediate plate about a first pivot axis perpendicular to said intermediate plate, the first cheek-plate being adapted to be secured to the first seat element and being connected to the intermediate plate via a first mechanism adapted to enable the angular position of the first cheek-plate relative to said intermediate plate to be adjusted in a substantially continuous manner, and said first mechanism being contained in a first closed housing defined by the first cheek-plate and the intermediate plate, the intermediate plate being axially secured to the first cheek-plate to close the first housing; and a second hinge comprising a second rigid cheek-plate parallel to the intermediate plate and pivotally mounted on said intermediate plate about a second pivot axis perpendicular to said intermediate plate and offset from the first pivot axis, said cheek-plate being adapted to be secured to the second seat element and being connected to the intermediate plate via a second mechanism which enables the second cheek-plate to be locked in at least one position relative to said intermediate plate, and the second mechanism being contained in a second closed housing defined by the second cheek-plate and the intermediate plate, which intermediate plate is axially secured to the second cheek-plate to close the second housing;

wherein the first mechanism comprises:

a first circular set of teeth centered on the first pivot axis, said first circular set of teeth being secured to the first cheek-plate and having teeth directed radially inwards;

a first toothed slug mounted to slide radially relative to the intermediate plate between a first engagement position in which the first slug meshes with the first circular set of teeth of the first mechanism to lock the first hinge, and a first retracted position in which said first slug does not co-operate with said first circular set of teeth;

a first cam resiliently urged towards a first rest position in which the first slug of the first mechanism ia in the first engagement position, said first cam being adapted to move to a first actuation position to enable said first slug to slide towards the first retracted position; and wherein the second mechanism comprises:

a second slug mounted to slide radially between a second engagement position where it co-operates with a complementary member to lock the second mechanism, and a second retracted position where said second slug does not cooperate with said complementary member, one of said second slug and said complementary member being carried by the intermediate plate and the other by the second cheek-plate;

a second cam resiliently urged towards a second rest position in which said second cam places the second slug in the second engagement position;

a drive member for moving the second cam from the second rest position towards a second actuation position where said second cam enables the second slug to slide towards the second retracted position; and wherein the second slug of the second mechanism is carried by the intermediate plate while the complementary member which co-operates with said second slug is carried by the second cheek-plate, and said drive member is common to the first and second mechanisms, said drive member being connected to the cams of the first and second mechanisms respectively via first and second mechanical links with lost motion, said drive member having a third rest position which corresponds to the cams of the first and second mechanisms both being in their respective rest positions, said drive member being movable in first and second opposite directions from the third rest position the first mechanical link with lost motion connecting the drive member to the first cam with no slack in the first direction of movement of the drive member and with slack in the second direction of movement of the drive member, said first mechanical link being adapted to move the first cam from the first rest position to the first actuation position when the drive member is moved in said first direction from the third rest position but not to interact with said first cam when the drive member is moved from the third rest position in said second direction, and the second mechanical link with lost motion connecting the drive member to the second cam with slack in the first direction of movement of the drive member and with no slack in the second direction of movement of the drive member, said second mechanical link being adapted to move the second cam from the second rest position to the second actuation position when the drive member is moved from the third rest position in the second direction, but not to interact with said second cam when the drive member is moved in the first direction.

2. A hinge device according to claim 1, in which the second mechanism is adapted to enable the second cheek-plate to be locked relative to the intermediate plate in a number n of relative locking positions, n being an integer lying in the range 1 to 3, the second mechanism being capable of being released and then allowing the second cheek-plate to pivot freely from its locking position either in a first angular direction over a first angular stroke of at least 60°, or in a second angular direction opposite to the first angular direction over a second angular stroke of at least 60°.

3. A hinge device according to claim 2, that is generally symmetrical in shape about a central axis situated between the first and second pivot axes.

4. A hinge device according to claim 1, in which each of the first and second cheek-plates is generally circular in shape.

5. A hinge device according to claim 1, in which said complementary member is a second circular set of teeth centered on the second pivot axis and directed radially inwards, the second slug having an outwardly directed set of teeth adapted to engage with said second circular set of teeth, and said second slug having a peg projecting axially and cooperating with a circular guide secured to the second circular set of teeth, said circular guide having at least one gap in which the peg engages when the intermediate plate and the second cheek-plate are in their relative angular position for locking, thereby enabling the second slug to engage with said second circular set of teeth, and the circular guide is adapted to co-operate with the peg by holding the second slug in its retracted position when the intermediate plate and the second cheek-plate are not in their relative angular position for locking.

6. A hinge device according to claim 1, in which the drive member is a handle rotatable about a third pivot axis perpendicular to the intermediate plate, the first and second mechanical links having lost motion each comprising a connecting rod connecting said handle to the first and second cams, respectively.

7. A vehicle seat comprising a seat-back mounted on a seat proper by means of at least one hinge device according to claim 1, the hinge device being disposed on one side of the seat so that the first and second pivot axes extend horizontally and transversely relative to the seat, the first cheek-plate being secured to the seat-back and the second cheek-plate being secured to the seat proper.

8. A vehicle seat comprising a seat-back mounted on a seat proper by means of at least one hinge device according to claim 1, the hinge device being disposed on one side of the seat so that the first and second pivot axes extend horizontally and transversely relative to the seat, the first cheek-plate being secured to the seat proper and the second cheek-plate being secured to the seat back.

* * * * *